US012265094B2

(12) United States Patent
Grimwood et al.

(10) Patent No.: US 12,265,094 B2
(45) Date of Patent: *Apr. 1, 2025

(54) SAMPLE TUBE AND METHOD

(71) Applicant: Azenta US, Inc., Burlington, MA (US)

(72) Inventors: Robin D. Grimwood, Chelford (GB); Hans Harzl, Manchester (GB); David Harding, Edgworth Bolton (GB); David Gray, Southborough, MA (US)

(73) Assignee: Azenta US, Inc., Burlington, MA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/872,809

(22) Filed: May 12, 2020

(65) Prior Publication Data
US 2020/0271676 A1 Aug. 27, 2020

Related U.S. Application Data

(63) Continuation of application No. 15/725,497, filed on Oct. 5, 2017, now Pat. No. 10,677,810.
(Continued)

(51) Int. Cl.
*G01N 35/00* (2006.01)
*B01L 3/00* (2006.01)
(Continued)

(52) U.S. Cl.
CPC ...... *G01N 35/00732* (2013.01); *B01L 3/5023* (2013.01); *B01L 3/54* (2013.01);
(Continued)

(58) Field of Classification Search
None
See application file for complete search history.

(56) References Cited

U.S. PATENT DOCUMENTS 4,060,457 A * 11/1977 Iizuka ............... C12M 23/06
435/283.1
5,540,331 A 7/1996 Wong
(Continued)

FOREIGN PATENT DOCUMENTS

DE 102013206967 A1 6/2014
EP 1007213 A1 6/2000
(Continued)

OTHER PUBLICATIONS

Hincapie-Ramos et al., "Mediated tabletop interaction in the biology lab: exploring the design space of the rabbit," Proceedings of the 13th International Conference on Ubiquitous Computing, ACM, 2011.
(Continued)

*Primary Examiner* — Matthew D Krcha
(74) *Attorney, Agent, or Firm* — Hamilton, Brook, Smith & Reynolds, P.C.

(57) ABSTRACT

A sample tube includes a barcode split into components at the bottom of the sample tube. Each barcode component stores less than the full data output from the barcode, but the components combine to full data output. Redundant diagonal components provide for error checking. A center region between the barcode components supports an electrical circuit or an optical or acoustic window. The sample tube may have a sidewall with a substantially cylindrical open end and non-cylindrical end closed with a bottom, the non-cylindrical end orienting the sample tube in a rack. Additional non-cylindrical surfaces are provided to orient the sample tube relative to complementary surfaces at a gripper. The sample tube of a particular application is positioned in an acoustic dispensing system where acoustic waves are transmitted through a center window for surveying and dispensing.

9 Claims, 21 Drawing Sheets

Related U.S. Application Data

(60) Provisional application No. 62/405,714, filed on Oct. 7, 2016.

(51) Int. Cl.
*B01L 9/06* (2006.01)
*G01N 1/02* (2006.01)
*G01N 35/04* (2006.01)

(52) U.S. Cl.
CPC .............. *B01L 3/5453* (2013.01); *B01L 9/06* (2013.01); *B01L 2200/147* (2013.01); *B01L 2300/021* (2013.01); *B01L 2300/022* (2013.01); *B01L 2300/0851* (2013.01); *G01N 2001/028* (2013.01); *G01N 2035/00742* (2013.01); *G01N 2035/00752* (2013.01); *G01N 35/0099* (2013.01); *G01N 2035/0401* (2013.01); *G01N 2035/041* (2013.01); *G01N 2035/0429* (2013.01)

(56) References Cited

U.S. PATENT DOCUMENTS

| | | | |
|---|---|---|---|
| 5,862,934 | A | 1/1999 | Sattler et al. |
| 6,270,728 | B1 | 8/2001 | Wijnschenk et al. |
| 6,372,293 | B1 | 4/2002 | Mathus et al. |
| 6,802,454 | B1 | 10/2004 | McMurtry et al. |
| 6,818,859 | B2 | 11/2004 | Lodge |
| 7,207,481 | B2 | 4/2007 | Barenburg et al. |
| 7,428,996 | B2 | 9/2008 | Pintsov et al. |
| 7,487,914 | B2 | 2/2009 | Yoon et al. |
| 7,543,748 | B2 | 6/2009 | Kiliccote |
| 7,562,811 | B2 | 7/2009 | Nemet et al. |
| 7,856,795 | B2 | 12/2010 | Grimard |
| 8,196,821 | B2 | 6/2012 | Nemet et al. |
| 8,925,821 | B2 | 1/2015 | Berssen et al. |
| 10,697,988 | B2 | 6/2020 | Watanabe et al. |
| 2001/0021356 | A1 | 9/2001 | Konrad |
| 2002/0098126 | A1* | 7/2002 | Day ...................... B01L 3/5453 422/550 |
| 2002/0106309 | A1 | 8/2002 | Mathus et al. |
| 2003/0175774 | A1 | 9/2003 | Hunkapiller et al. |
| 2004/0063109 | A2 | 4/2004 | Hunkapiller et al. |
| 2005/0191216 | A1 | 9/2005 | Day |
| 2007/0017885 | A1* | 1/2007 | Taike .................. B01L 3/50855 211/85.13 |
| 2007/0036686 | A1 | 2/2007 | Hatamian et al. |
| 2007/0053794 | A1 | 3/2007 | Perez et al. |
| 2007/0119575 | A1 | 5/2007 | Barenburg et al. |
| 2008/0121688 | A1 | 5/2008 | Harrop |
| 2008/0217391 | A1 | 9/2008 | Roof et al. |
| 2008/0254544 | A1 | 10/2008 | Modzelewski et al. |
| 2010/0018330 | A1 | 1/2010 | Marty et al. |
| 2010/0021993 | A1 | 1/2010 | Wang et al. |
| 2010/0294050 | A1 | 11/2010 | Massaro |
| 2011/0308335 | A1 | 12/2011 | Pink et al. |
| 2012/0051986 | A1* | 3/2012 | Pavlova ................ B01L 3/5453 422/562 |
| 2014/0046126 | A1 | 2/2014 | Gilligan et al. |
| 2014/0102239 | A1 | 4/2014 | Umeno |
| 2015/0122880 | A1 | 5/2015 | Nemet et al. |
| 2015/0197372 | A1 | 7/2015 | Majlof et al. |
| 2015/0273468 | A1* | 10/2015 | Croquette ........... B01L 3/50825 422/63 |
| 2015/0302348 | A1 | 10/2015 | Blaine |
| 2018/0154359 | A1 | 6/2018 | Ueyama |

FOREIGN PATENT DOCUMENTS

| | | | |
|---|---|---|---|
| EP | 1321368 | A1 | 6/2003 |
| EP | 1668570 | A1 | 6/2006 |
| EP | 1791083 | A2 | 5/2007 |
| EP | 1890748 | A1 | 2/2008 |
| EP | 2070012 | A2 | 6/2009 |
| EP | 2328683 | A1 | 6/2011 |
| EP | 2386356 | A1 | 11/2011 |
| EP | 2455761 | A1 | 5/2012 |
| FR | 2957536 | A1 | 9/2011 |
| JP | 2001-502595 | A | 2/2001 |
| JP | 2001-219937 | A | 8/2001 |
| JP | 2002-296285 | A | 10/2002 |
| JP | 2003-083984 | A | 3/2003 |
| JP | 4168091 | B2 | 2/2004 |
| JP | 2005-172682 | A | 6/2005 |
| JP | 2007-033061 | A | 2/2007 |
| JP | 2008-191070 | A | 8/2008 |
| JP | 2009-534054 | A | 9/2009 |
| JP | 5296687 | B2 | 1/2010 |
| JP | 2015-514215 | A | 5/2015 |
| JP | 5843356 | B2 | 1/2016 |
| WO | 98/05427 | A1 | 2/1998 |
| WO | 01/70404 | A1 | 9/2001 |
| WO | 2005/036454 | A1 | 4/2005 |
| WO | 2006/089247 | A2 | 8/2006 |
| WO | 2006/123252 | A1 | 11/2006 |
| WO | 2006/130760 | A2 | 12/2006 |
| WO | 2008/028028 | A2 | 3/2008 |
| WO | 2010/023102 | A1 | 3/2010 |
| WO | WO-2010134966 | A1 * | 11/2010 ............ B01L 3/5453 |
| WO | 2013/002269 | A1 | 1/2013 |
| WO | 2012/069345 | A1 | 5/2013 |
| WO | 2013/148648 | A1 | 10/2013 |
| WO | 2014/114938 | A2 | 7/2014 |
| WO | 2015/055032 | A1 | 4/2015 |
| WO | 2015/108807 | A1 | 7/2015 |
| WO | 2016157898 | A1 | 10/2016 |
| WO | 2017/066116 | A1 | 4/2017 |
| WO | 2017158687 | A1 | 9/2017 |
| WO | 2018067795 | A2 | 4/2018 |

OTHER PUBLICATIONS

Koroneos, "Securing the Supply Chain with RFID," Pharmaceutical Technology; Sep. 2005; 29, 9: ProQuest Science Journals.

Notification of Transmittal of the International Search Report and Written Opinion of the International Searching Authority, or the Declaration, for International Application No. PCT/US2017/055300, titled: "Sample Tube and Method," Dated: Apr. 17, 2018 (21 pages).

International Preliminary Report on Patentability for International Application No. PCT/US2017/055300, titled: "Sample Tube and Method," Issued: Apr. 9, 2019 (14 pages).

Labcyte Inc., "Echo® Liquid Handlers, Redefine Scientific Innovation With Acoustic Liquid Handling;" Brochure, Version 3.0, Jan. 2019.

* cited by examiner

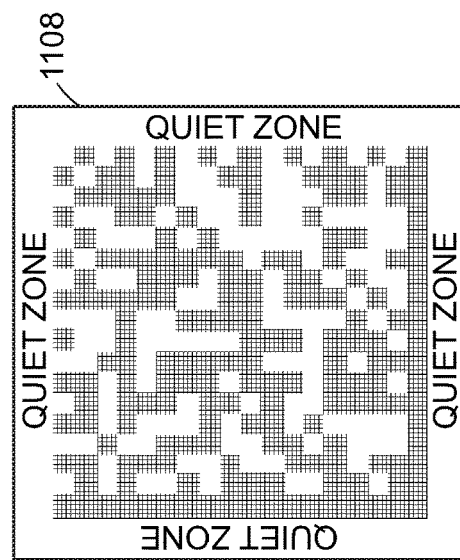
FIG. 11D
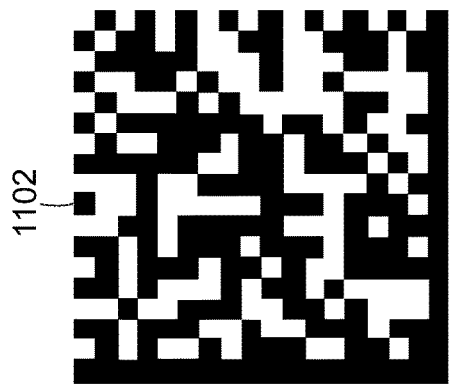
FIG. 11A
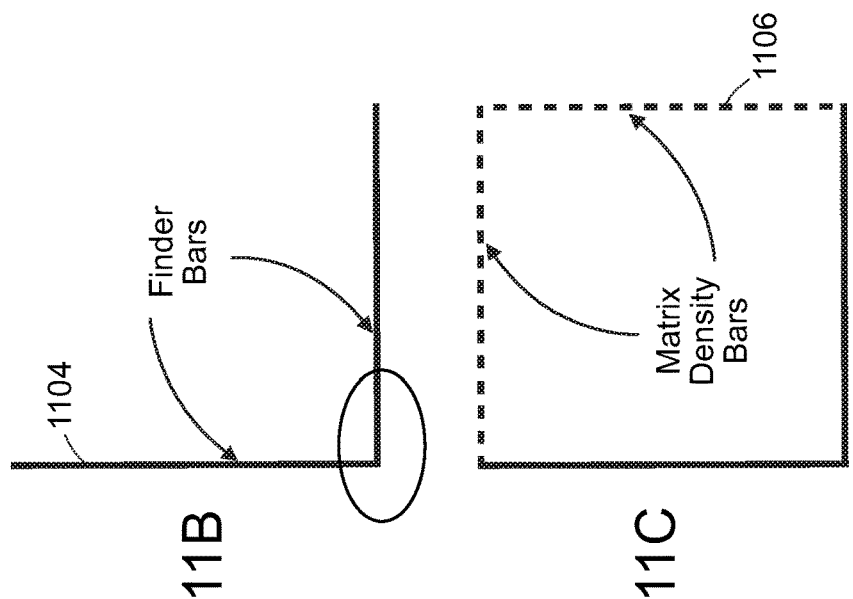
FIG. 11B
FIG. 11C

SAMPLE TUBE AND METHOD

RELATED APPLICATIONS

This application is a continuation of U.S. application Ser. No. 15/725,497, filed on Oct. 5, 2017, which claims the benefit of U.S. Provisional Application No. 62/405,714, filed on Oct. 7, 2016. The entire teachings of the above applications are incorporated herein by reference.

BACKGROUND

Handling and storage of chemical and biological samples typically employs storage of the samples and reagents in individual sample tubes that are retained in large storage racks for transport and storage efficiency. Sample tubes typically are stored in industry-standard racks having an SBS (Society for Biomolecular Screening) format. For example, an 8×12 array of sample tube-holding receptacles with a 9 mm pitch carries 96 sample tubes. Similarly, other standard racks may support 384 sample tubes. Racks of tubes may be frozen in large automated storage systems held at, for example, −20° C. or −80° C.

Individual tubes may carry a barcode for identification. The barcode may be on the sides of the tubes, but to enable reading of an entire rack of tubes with a single image, the barcodes may be at the bottom ends of the tubes. Robotic systems are able to pick individual bar-coded tubes from racks and reorder the tubes or move the tubes to different racks or other locations. The individual tubes are typically handled by grippers at picking stations.

SUMMARY OF THE INVENTION

Recent advancements in sample tube handling and sample processing are not compatible with conventional barcodes which fill the bottom ends of sample tubes. According to the disclosed invention, a tube bottom or a portion of a tube bottom can serve as a functional window for the transmission of light or sound. In some instances, the window can permit light transmission such as used in assessing the clarity or color of the sample or in spectroscopy, and the conventional barcode interferes with the necessary light transmission. In other instances, a circuit chip and/or transmitter may be positioned in the bottom of a sample tube. That circuit chip or transmitter may, for example, provide RFID identification of the individual tube. Such a circuit may also be interrogated, for example, by illumination with a laser beam that energizes the circuit to output an identifier or other data from the tube. Because the conventional barcode obscures the bottom of a tube, the presence of a conventional barcode is incompatible with reading such a circuit chip or receiving transmitted data.

Another technology that is not compatible with conventional barcodes at the bottom ends of tubes is that of acoustic dispensing. Acoustic dispensing, such as provided by the Echo™ liquid handling technology of Labcyte, Inc., has been used to transfer small droplets of sample through acoustic droplet ejection from wells of source microplates to the wells of inverted destination microplates opposite to the source plates. That technology is now proposed for use in transferring droplets from sample tubes in racks to wells in inverted microplates or to inverted tubes in destination racks. A conventional barcode at the bottom end of a tube interferes with the acoustic coupling from the acoustic transducer to the liquid in the sample tube.

In accordance with one aspect of the disclosed system, a sample tube comprises a sidewall open at one end and closed with a bottom at the opposite end. A two-dimensional barcode on the bottom stores data that is readable from below the tube. To provide a functional window (e.g., an unobstructed space, or a space unobstructed by a barcode or other printing) at the center of the tube bottom, the barcode comprises plural barcode components positioned toward the periphery of the bottom from the bottom center. Each barcode component stores less than the full data output, and data read from the plural barcode components is combined to provide the full data output. With the barcode thus split into multiple components and shifted to the periphery of the bottom end of the sample tube, the center region of the bottom is left open for other functions such as electronic circuit chip interrogation, observing the sample via light, or acoustic coupling in an acoustic dispenser.

Redundant barcode components may be provided. Preferably, two diagonally positioned barcode components combine to provide a full data output, and a redundant set of two diagonally positioned barcode components combine to provide redundant full data output.

The center region between the barcode components may support a circuit energized by laser to emit radio frequency data. It may also support a more conventional radio frequency identification chip. A temperature sensor may be included in a circuit positioned in a center region, the circuit emitting temperature data. Alternatively, an open window may be left in the central region of the bottom to transmit optical or acoustic signals.

A cylindrical open end of the sidewall supports a threaded cap that closes the open end. The sidewall may further comprise orienting surfaces to orient the sample with respect to a gripper. The non-cylindrical orienting surfaces may be flat surfaces. By contrast, the bottom end of the sample tube may have a noncylindrical cross-sectional shape such as a rectangular cross-section. The orienting surfaces may extend along edges of the rectangular cross-section. The barcode may include an element to confirm orientation of the sample tube.

A sample tube handling system may comprise a sample rack and a plurality of the sample tubes positioned in the rack. An imaging system images barcodes of individual sample tubes in the rack. An acoustic dispensing system may survey the acoustic characteristics of center windows of the sample tube bottoms, and the survey data with respect to individual sample tubes identified by the barcodes may be stored in a database.

Sample tubes are typically cylindrical. However, it can be advantageous to have a non-cylindrical bottom end of the sample tube such as a rectangular cross-section. For example, a rectangular bottom end allows for consistent orientation of the sample tube relative to the rack. In acoustic dispensing, the surface through which the acoustic wave passes is first surveyed to determine its acoustic characteristics. So long as a consistent orientation is maintained, the surface need not be resurveyed with subsequent dispensing.

In accordance with another aspect of the disclosed system, the sample tube comprises a sidewall that is substantially cylindrical and open at one end and non-cylindrical and closed with a bottom at the opposite end. Non-cylindrical surfaces formed in the substantially cylindrical end of the sidewall may be gripped by complementary gripper surfaces of a gripper, precluding tube rotation in the gripper, and assuring proper orientation of the sample tube relative to the gripper.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 11A-D illustrate a two-dimensional barcode including elements for detecting orientation.

DETAILED DESCRIPTION

A description of example embodiments of the invention follows.

Figure 1A:
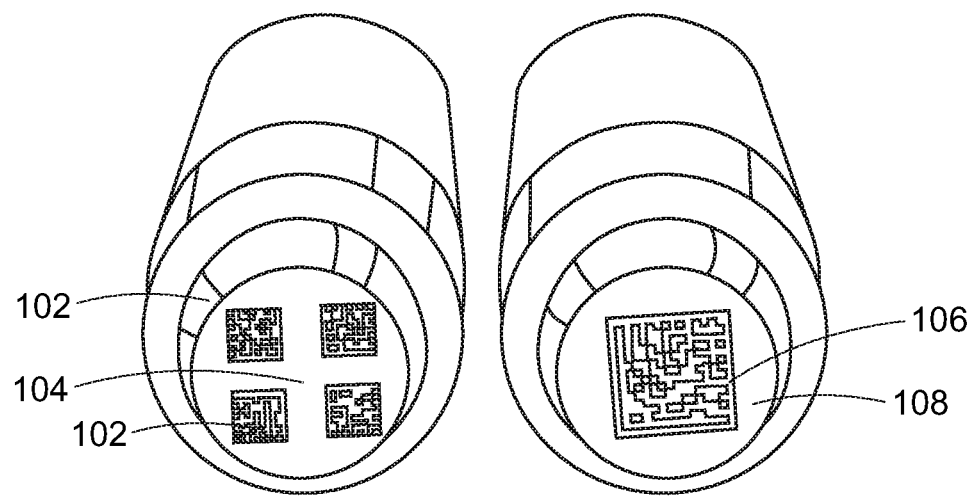
FIG. 1A provides a comparison of a split barcode of the present invention to the left relative to prior art barcode on a sample tube to the right.

FIG. 1A illustrates the ends of four sample tubes. The tube on the right has a conventional 2-D bar code grid 106 that encodes a quantity of data such as 10 characters in a 14×14 grid, for example, "FR01036242." As can be seen, the barcode takes up a substantial portion of the bottom end 108 of the sample tube. As noted above, in many applications it is desirable to have an open window free of barcode in the tube bottom. For example, a window may provide for observation of the sample using light, acoustic dispensing, or interrogation of electronic circuit chips. The conventional barcode cannot be reduced in size to allow it to be positioned to the periphery relative to a center window without compromising the ability to reliably read the barcode. In some applications, such as in low temperature storage of chemical and biological samples, the presence of frost on a conventional bar code which has been merely reduced in size can make reading the bar code difficult and/or unreliable. To allow for a center window 104, the code components 102 shown on the tube to the left can be sized to be positioned to the periphery of the center opening. However, each barcode component 102 only encodes a portion of a code, for example, one-half of a full code. For example, the two components 102 include portions of a full 10 character code, the bar codes are read and decoded, and the decoded data from each of the components is concatenated. In one embodiment, each of the code components 102 is a 10×10 grid which can encode three alphanumeric characters or six numeric characters. For example, one barcode component may encode "FR01" while the other component encodes "036242". Because only one of the components includes the alpha code "FR", the proper order of the concatenated data is apparent. Other flags for distinguishing the two components can be used such as a unique alphanumeric string or symbol in one or both components.

With only two components 102 required to encode the required data, there is room for two additional components. Those two additional components may be used to provide redundant data. This is particularly useful because the reduced size of the barcodes is more likely to result in error in decoding. Redundant components allow for additional error checking or even error correction.

Figure 1B:
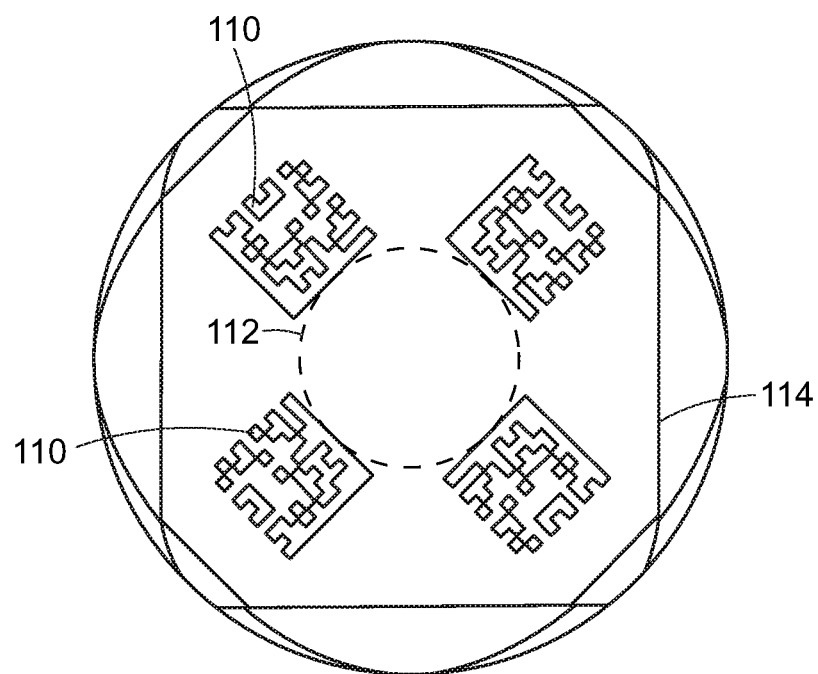
FIG. 1B illustrates an alternative arrangement of split barcode components at the end of a sample tube.

FIG. 1B shows an alternative layout of the four barcode components to allow a center window 112. Possible dimensions are presented in millimeters. As shown, the bottom of the tube may be either circular as illustrated in FIG. 1A or rectangular as in FIG. 1B.

Figure 1C:
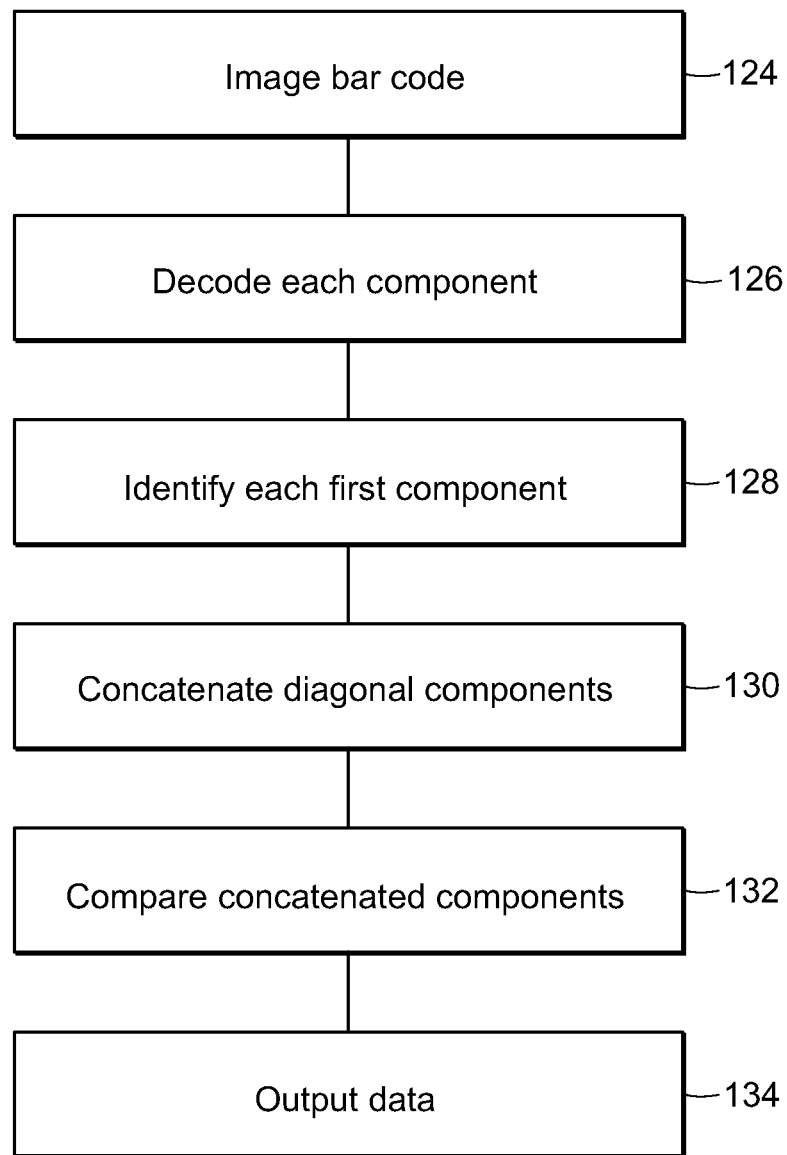
FIG. 1C is a flowchart illustrating the operation of reading the barcode components of FIGS. 1A and B.

FIG. 1C illustrates the process of decoding the barcode components of FIGS. 1A and B. At 124, the image of the four components is taken. The image may be of the bottom of a single sample tube, but more likely a single image would be taken of the bottoms of the entire rack of sample tubes. At 126, each of the four barcode components is decoded. By printing the associated pairs of barcode components diagonally, there is no confusion as to which components match as pairs. In each diagonal pair, the order is determined by a predefined character in one of them at 128. The diagonal components are then concatenated at 130 to provide two redundant decoded outputs. Those redundant components may be compared at 132 in an error check. Assuming the two outputs match, a single data output is provided at 134. If they do not match, the redundant codes may allow for error correction. Otherwise, reimaging or a manual check may follow.

Figure 1D:
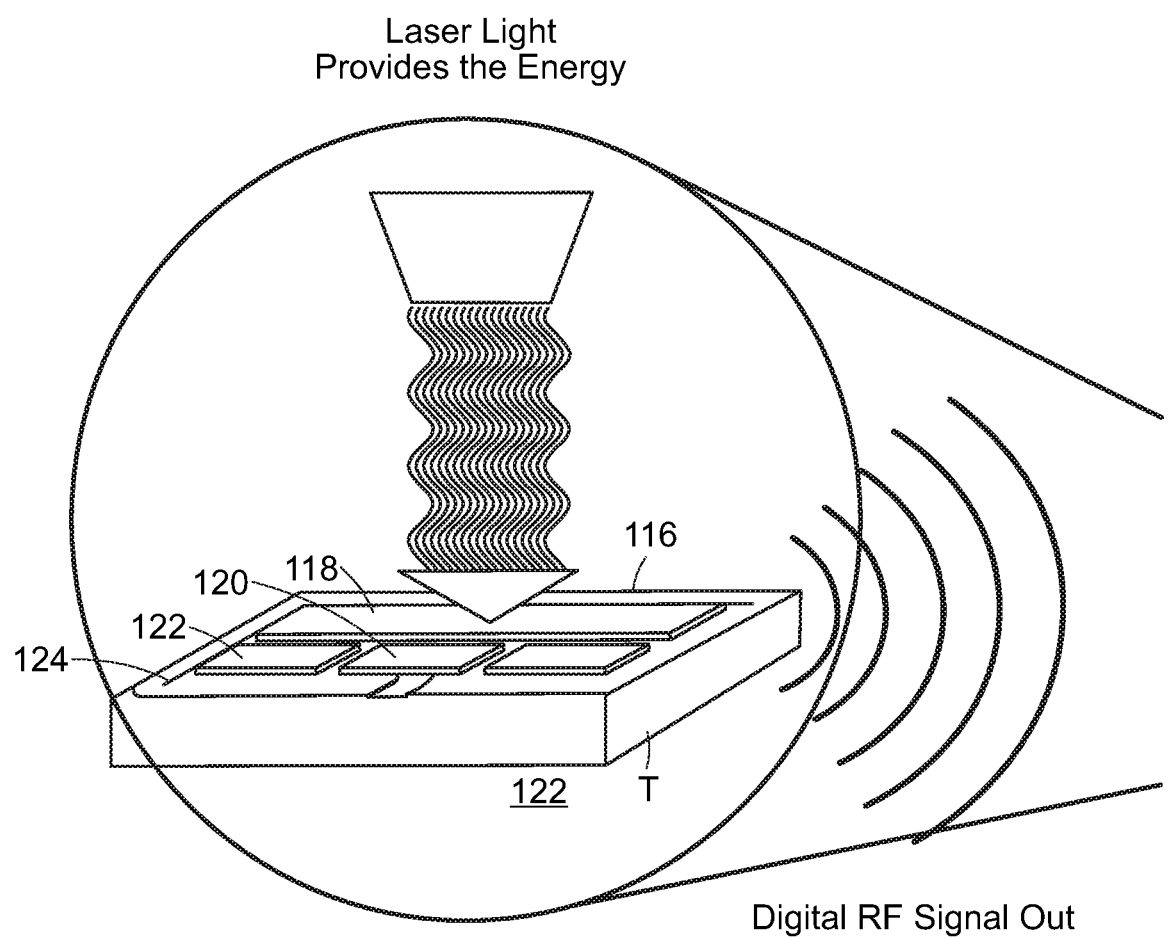
FIG. 1D illustrates a potential circuit in a center region of the sample tube bottoms of FIGS. 1A and B.

As shown in FIG. 1D, a circuit chip 116 placed at the center window may include a processor 120, memory 122, photocell 118 and antenna 124. The photocell is energized by received laser light. The circuit is powered by light and is enabled to emit the digital RF signal out through the antenna. The data may simply be identification information or other sample information. However, it may also store historical information for the tube and/or for the sample stored within. In particular, the circuit may include a temperature sensor 120 in close proximity to, or in contact with, the sample stored in the sample tube. Such proximity of a temperature sensor to the sample can provide for more accurate temperature measurements and/or assessment of the sample. In some instances the temperature sensor and the associated circuit chip is provided in the bottom of the tube so that regardless of the volume of the sample in the tube at least some of the sample is in proximity to the temperature sensor. In some embodiments, temperature history of the sample can be maintained within the circuit chip of the tube and/or in a data management system exterior the tube. Such histories are particularly important where the stored sample is thermally labile.

Figure 2A:
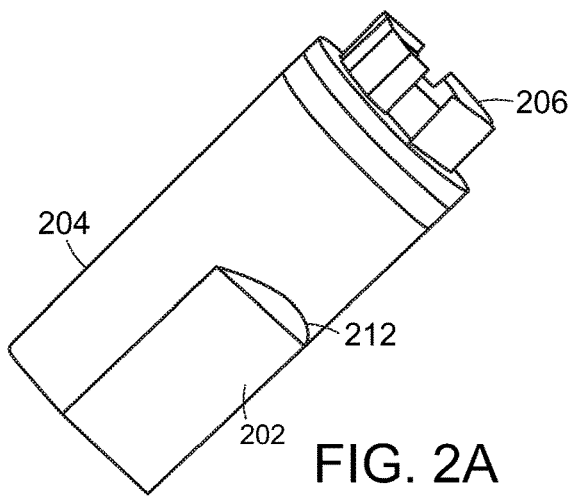
FIGS. 2A and B are side and end views of an embodiment of the invention having flat side surfaces at the closed end of the sample tube.
Figure 2B:
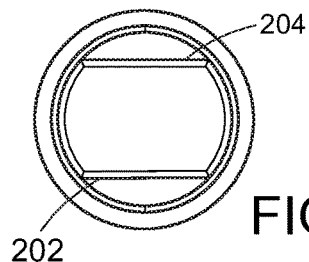

Sample tubes are typically cylindrical as illustrated in FIG. 1A. However, in some applications, there can be advantages to having a non-cylindrical bottom end of the tube such as a rectangular form having flat sides as illustrated in FIGS. 2-6. For example, in some applications tube geometry and/or orientation of a tube are important. For example, some applications (e.g., dispensing applications such as acoustic dispensing) may require knowledge of the physical and/or material characteristics of a tube (e.g., material of construction, density, physical flaws, material of construction inconsistencies, thickness variations, tube manufacturing variations, etc.) as they vary throughout the tube or a portion of the tube. Therefore, for some applications, the tube is surveyed to determine these characteristics. Methods for surveying a tube can include, for example, optical observation or taking of sound or electromagnetic wave measurements. In many cases the survey data will be specific to the particular tube orientation and tube orientation will need to be known or maintained in accordance with requirements of the specific application. A non-cylindrical embodiment allows the tube to be properly oriented within the supporting rack. In the tube of FIGS. 2A and 2B, opposite flat walls 202 and 204 are provided. However, it is still beneficial to have a cylindrical open end to the tube in order to enable a threaded closure 206 such as a screw cap to be applied to the tube.

Figure 3A:
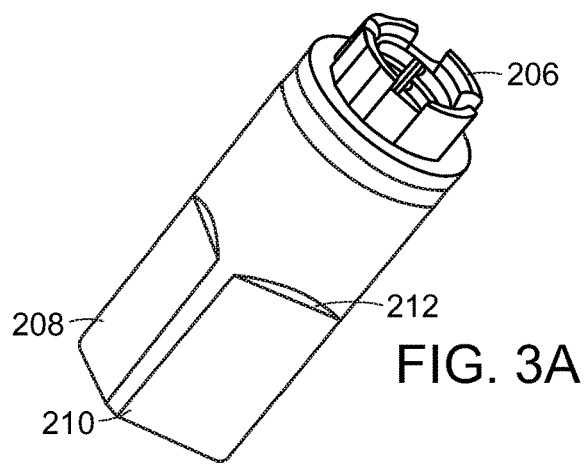
FIGS. 3A and 3B are side and end views of a sample tube having a substantially rectangular cross-section at its closed end.
Figure 3B:
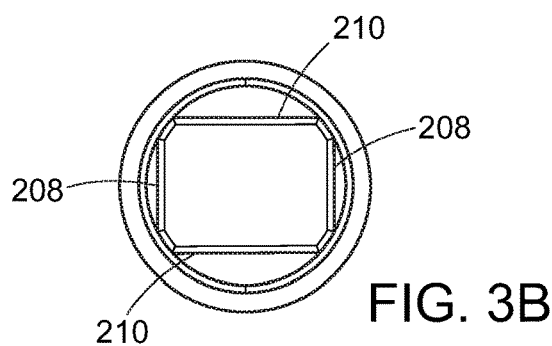

Side view FIG. 3A and bottom view FIG. 3B illustrate an alternative in which four flat surfaces at the bottom end of the tube provide a substantially rectangular shape. In this case, longer flat sides 210 are opposite to each other, and shorter flat sides 208 are opposite to each other. A substantially rectangular shape with different length opposing sides reduces the number of possible orientations of the tube in a corresponding rack to only two. In other embodiments, the shape of the bottom end of the tube is square, which allows for four possible orientations in a rack. Other tube bottom shapes may allow only a single possible orientation in a rack.

Figure 4:
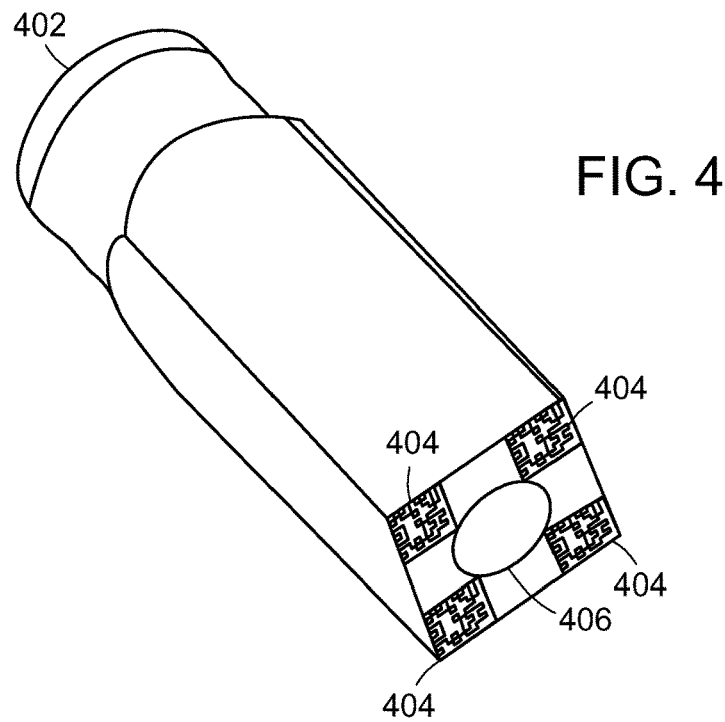
FIG. 4 is a perspective view of a sample tube having a rectangular cross-section closed end and split barcode components on the bottom end.

FIG. 4 illustrates a sample tube having a substantially rectangular bottom end, a cylindrical open end with screw cap 402, and four barcode components 404 surrounding the periphery of a central window 406. As noted, the window may be an optical or acoustic window or support a chip.

Figure 5A:
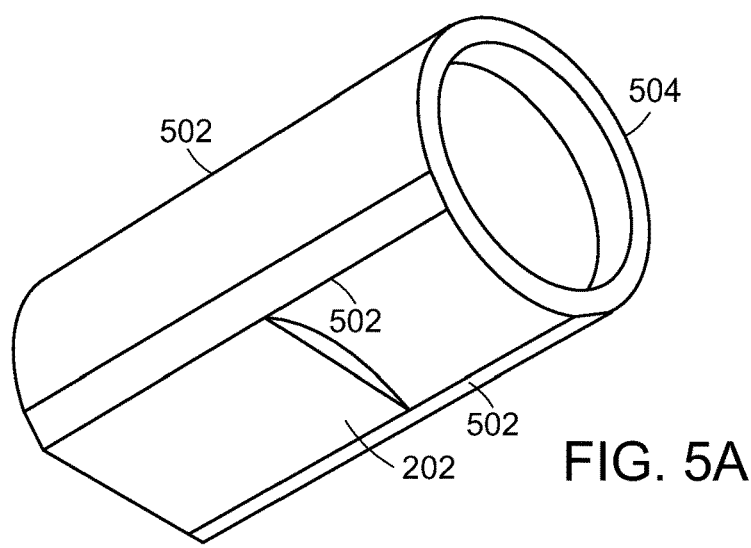
FIGS. 5A and 5B illustrate the sample tube similar to that of FIGS. 2A and B with additional orienting surfaces thereon.
Figure 5B:
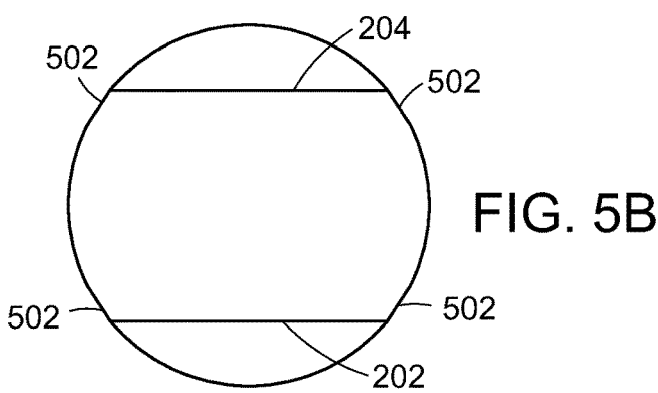

FIGS. 5A and 5B illustrate a modification of the sample tube of FIGS. 2A and 2B with the four component bar code. With a cylindrical open end of the sample tube, there is a possibility that the sample tube will be rotated within a gripper where the flat surfaces of the bottom end do not align with the flat surfaces of a receiving rack. In order to avoid such rotation, non-cylindrical surfaces, specifically flat slide pads, are formed about the periphery of the open end of the tube. Those surfaces do not interfere with the cylindrical opening into which the cap is threaded. Even an externally threaded tube could include the flat slide pads 502, but the slide pads would not need to extend all the way to the open end of the tube. In some embodiments, the slide pads are of the same material of construction as the tube and are integrally part of the tube. In other embodiments, the sliding pads can be of a different material of construction than the tube and may be integral with the tube (e.g., co-molded with the tube) or separately applied to the tube.

Figure 7B:
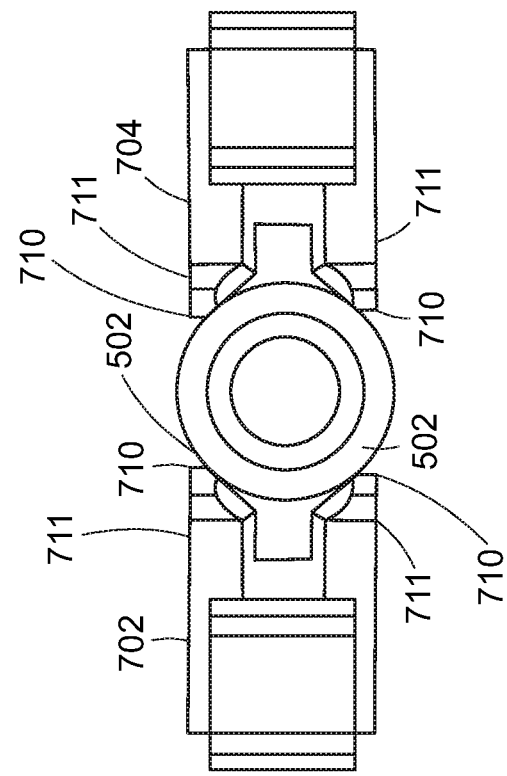
FIGS. 7A and B are perspective and plan views of a tube being gripped by gripper arms.
Figure 7A:
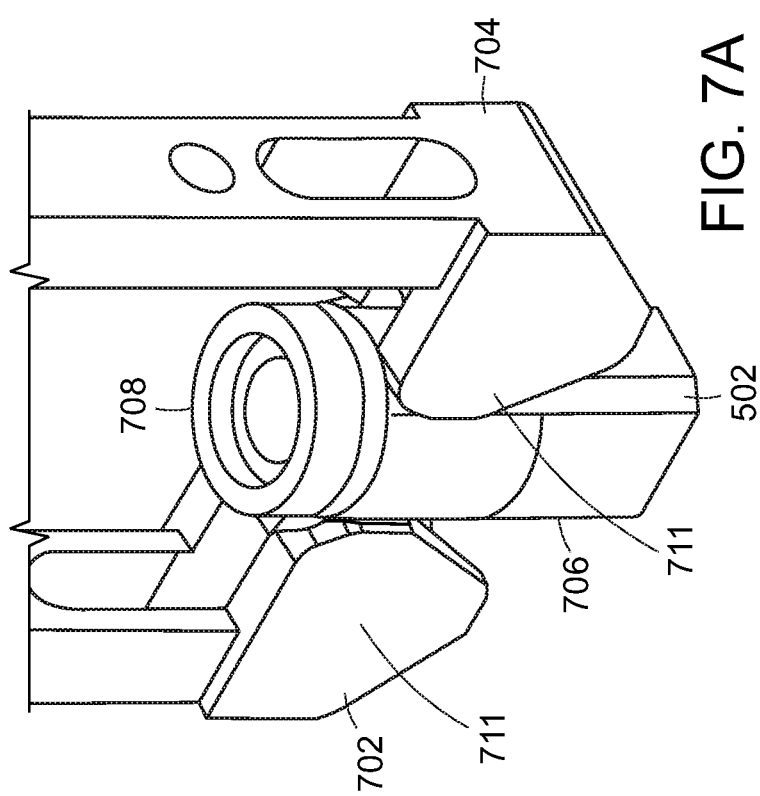

As illustrated in FIGS. 7A and 7B, a gripper assembly has corresponding flat surfaces. Two gripper fingers 702 and 704 move toward each other to grip a tube 706. In one embodiment, the gripper fingers 702 and 704 are held together under a spring force, tube 706 is pushed from the rack by a pusher mechanism to between the gripper fingers, and the tube is held there between by the spring force. In FIGS. 7A and 7B, the gripper fingers 702 and 704 are seen gripping the upper end of the tube 706 below a screw cap 708. Each gripper finger has two flat surfaces 710 in fingers 711 that complement the flat surfaces 502 of the sample tube. As the gripper fingers squeeze onto the sample tube, the complementing flat surfaces assure that the sample tube stays properly oriented within the arms without rotation. If there is a small amount of rotation as the tube is pushed up from the rack into the gripper fingers, as the tube comes between the fingers the flat side pads will cause the sample tube to rotate back into proper orientation.

Figure 6A:
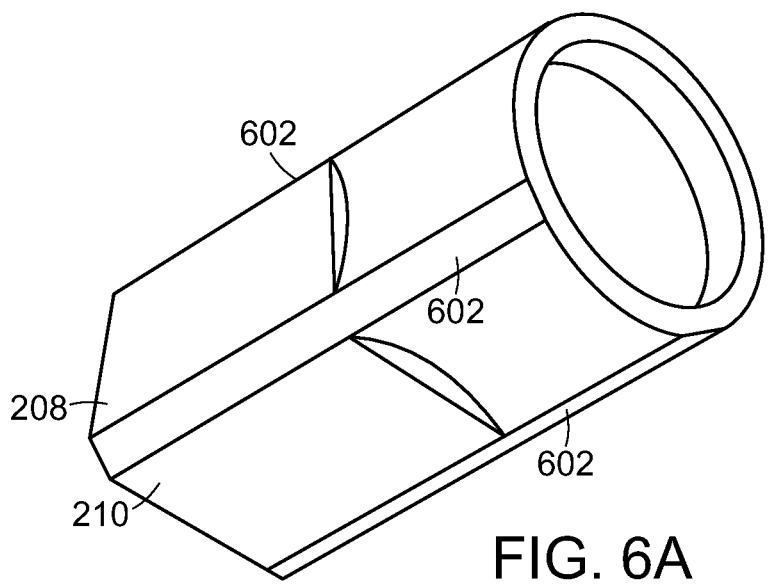
FIGS. 6A and 6B illustrate an alternative embodiment similar to that of FIGS. 3A and B having orienting surfaces thereon.
Figure 6B:
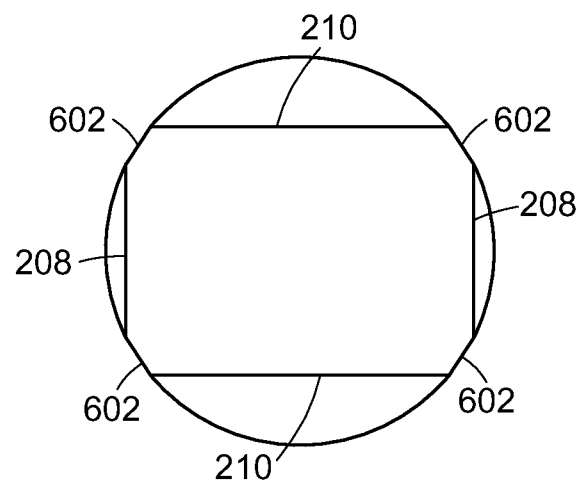

FIGS. 6A and 6B show the flat slide pads 602 added to the four flat surfaces embodiment of FIGS. 3A and 3B. As shown, faces of the slide pads 602 are angled at a substantial angle of about 45° relative to the faces of the flat sides 208, 210. Although the slide pads in each embodiment need not extend the full length of the sample tube, extending the full length simplifies the manufacturing process.

Figure 8A:
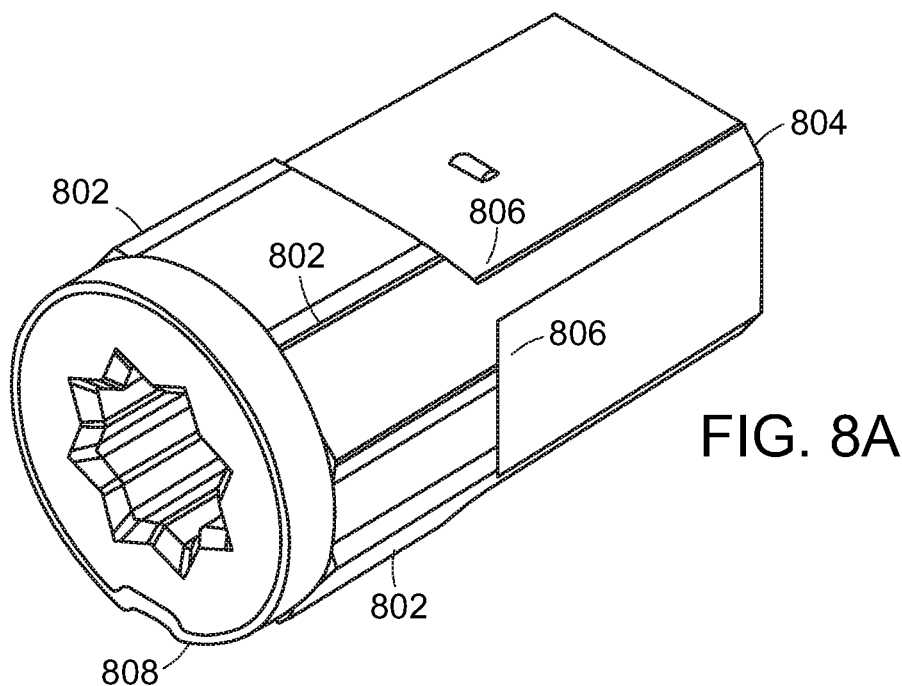
FIGS. 8A and B illustrates another sample tube embodiment in which the orienting surfaces are wider near the open end.
Figure 8B:
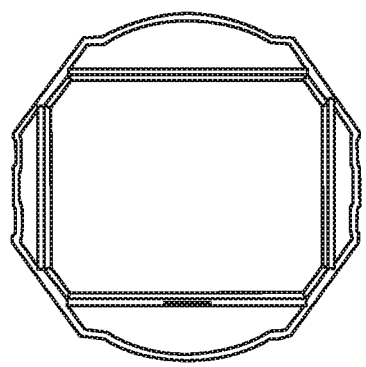

FIGS. 8A and 8B illustrate another slide pad modification of the geometry of FIGS. 6A and 6D and 3A and 3B. In this embodiment, a substantially wider slide pad 802 is provided at the open end of the sample tube, such as about 2.5 mm wide. However, the slide pad is narrow toward the bottom end 804 of the sample tube. The narrow slide pad allows for a wider chamfer 806 to better support, orient, and/or align the sample tube in the rack. As before, a threaded cap 808 closes the end of the sample tube.

Figure 9A:
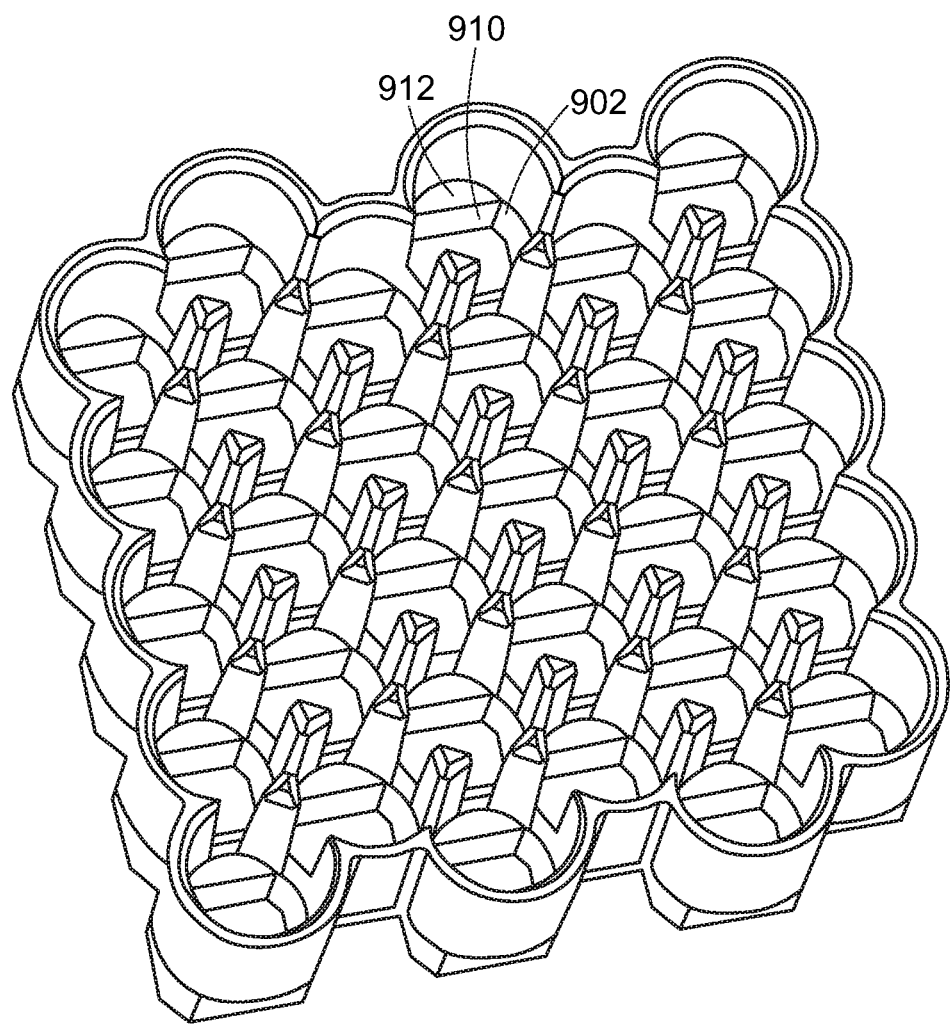
FIG. 9A illustrates a high-density rack having complementary surfaces for supporting the sample tube of FIGS. 6A and B.
Figure 9C:
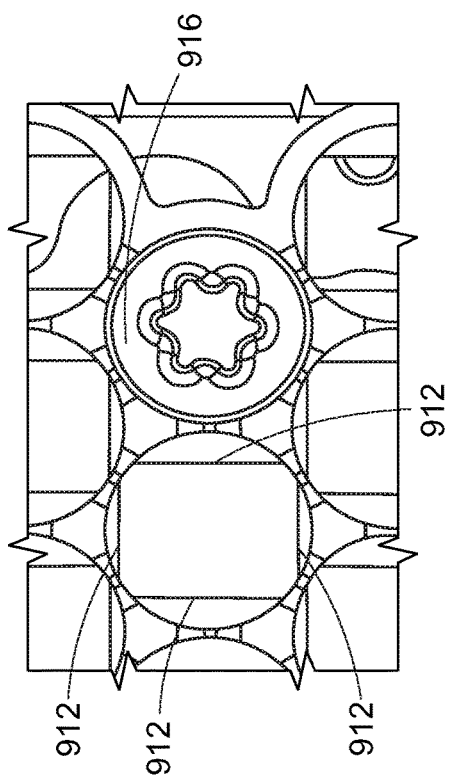
FIG. 9C is a plan view of a portion of the rack of FIG. 9A.
Figure 9D:
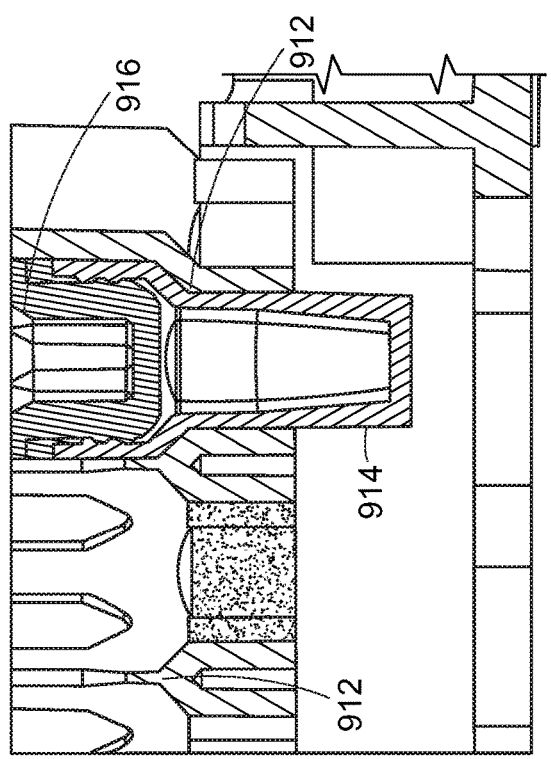
FIG. 9D is a side cross-sectional view of the rack of FIG. 9A having a sample tube positioned therein.
Figure 9B:
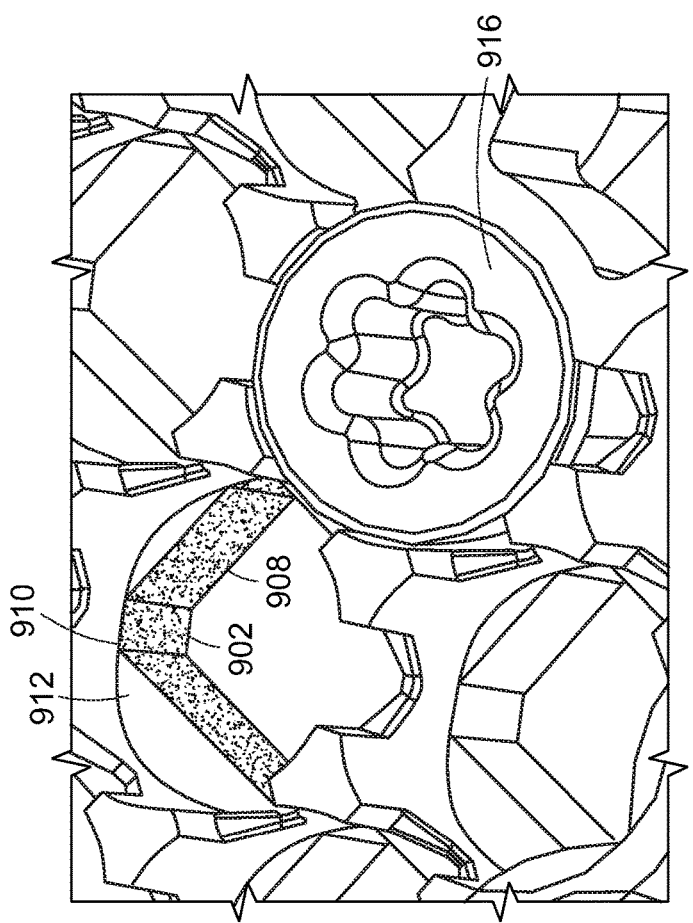
FIG. 9B is an enlarged view of a portion of the rack of FIG. 9A.

FIG. 9A illustrates a high density rack such as might be used for a storage rack in a automated tube storage system (e.g., a store). It can be seen that each column of tube receptacles is offset from an adjacent column to increase the density of tubes stored in the rack. Each receptacle can be seen to have four flat surfaces 908, 910 that are complementary to the flat surfaces 208, 210. Narrower flat surfaces 902 corresponding to the flat slide pads 602. The chamfers of the sample tube rest on support surfaces 912. Each of FIGS. 9B, 9C and 9D shows a single tube having a cap 916 seated within the rack. Similar features as these can also be used in an SBS format rack.

Figure 9E:
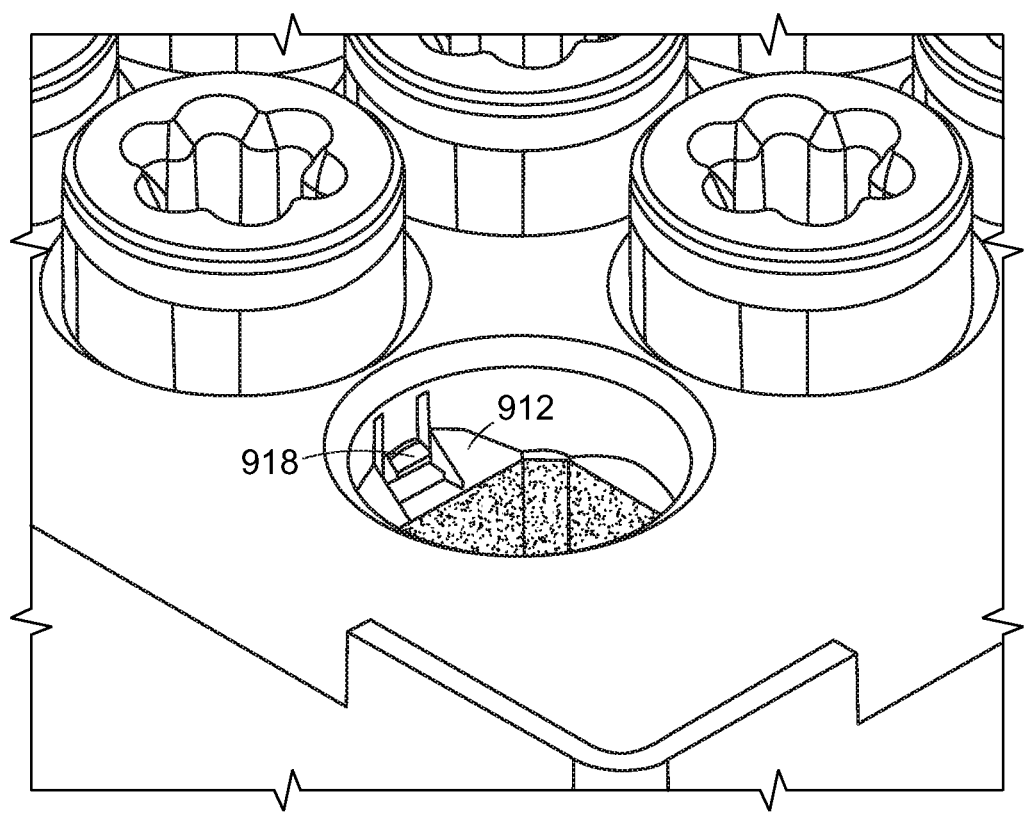
FIG. 9E is a perspective view of a portion of an alternative rack having a spring tab in the sample tube receptacle.

FIG. 9E shows a standard density rack (e.g., an SBS format rack) with several tubes supported in it. The empty receptacle illustrates a further modification in which a spring-loaded tab 918 is presented at one of the support surfaces 912. The tab 918 is able to snap into a depression formed in a side of the tube in order to lock the tube into place. If only a single tab and single depression are provided, it can be assured that the sample tube is placed in only one orientation.

Figure 10A:
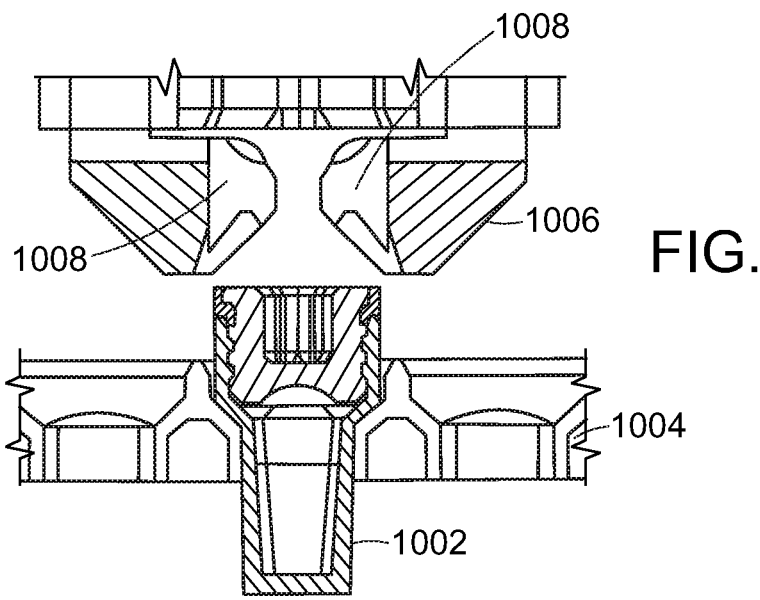
FIGS. 10A-C are cross-sectional views of a sample tube, rack and gripper in a sequence of moving the sample tube into the gripper.
Figure 10B:
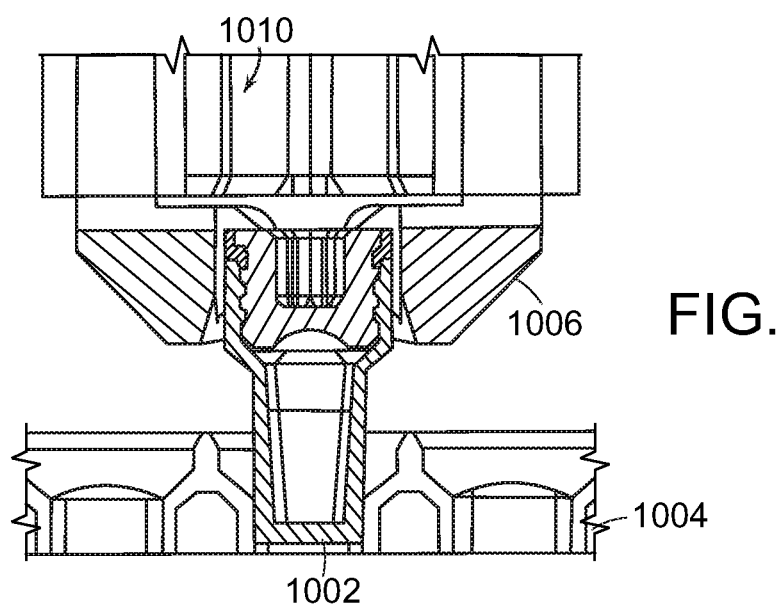
Figure 10D:
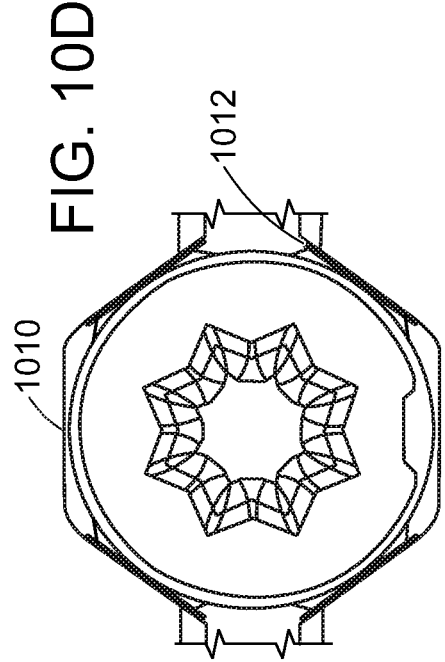
FIG. 10D is a plan view of the sample tube positioned in the gripper.
Figure 10C:
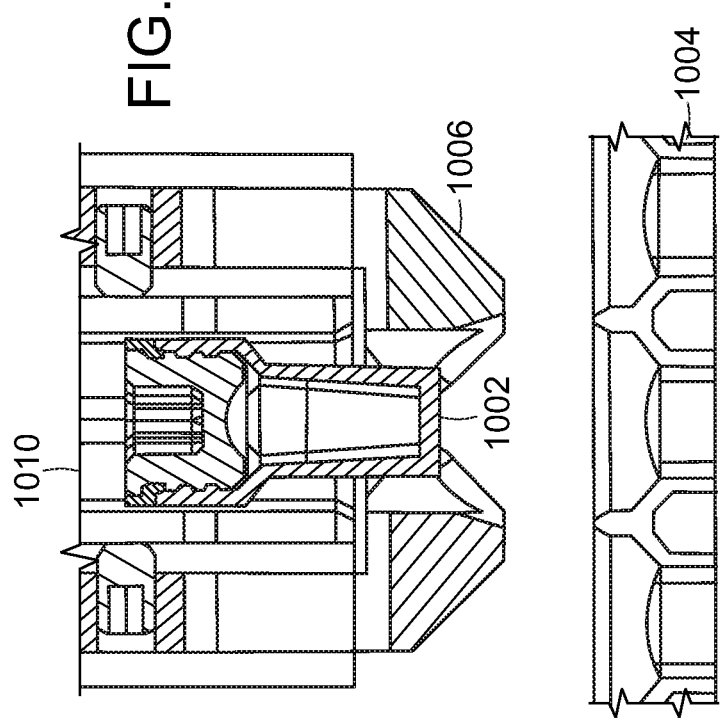

FIGS. 10A, B, C and D illustrate a tube picking sequence with an alternative gripper design. As illustrated in FIG. 10A, a tube 1002 is initially seated in a rack 1004. The gripper 1006 has arms that are fixed relative to each other but which support spring-loaded clips 1008. As shown in FIG. 10B, the tube is first pressed up from the rack with a pusher (not shown) from below the rack into the clips 1008. Rotation is there constrained by both the rack and the spring-loaded clips. Thereafter, as illustrated in FIG. 10C, the tube is further pushed up into cartridge 1010 that has surfaces 1012 (FIG. 10D) that complement the surfaces on the tube to constrain the tube from rotation.

FIGS. 11A, B, C, and D illustrate a conventional barcode which, according to the present invention, allows for detecting proper orientation of a tube. As illustrated in FIG. 11A, two bars 1104 in the barcode 1102 identify two edges of the barcode. As illustrated in FIG. 11C, matrix density bars on the opposite edges of the barcode 1102 define the rows and columns of the barcode. As shown in FIG. 11D, a quiet zone 1108 may surround the barcode. The edge of the 2-D code can be detected by imaging software detecting the quiet zone, that is, the blank area surrounding the code. The two finder bars 1104 then give the orientation. This orienting portion of the barcode is applied to at least one of the barcode components and preferably to all four.

Figure 12C:
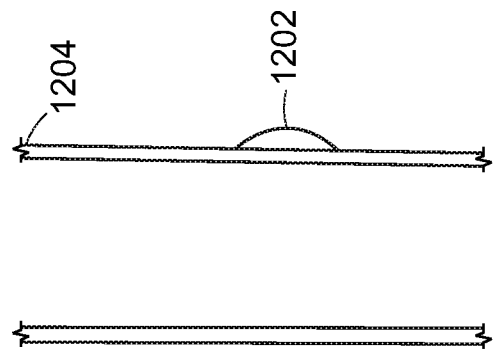
FIGS. 12A-C are perspective, plan and side views of a sample tube having a protrusion for locking the sample tube at a fixed and consistent height within the rack.
Figure 12B:
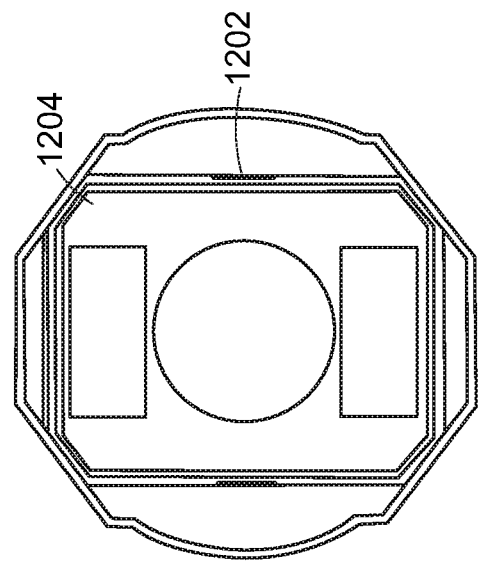
Figure 12A:
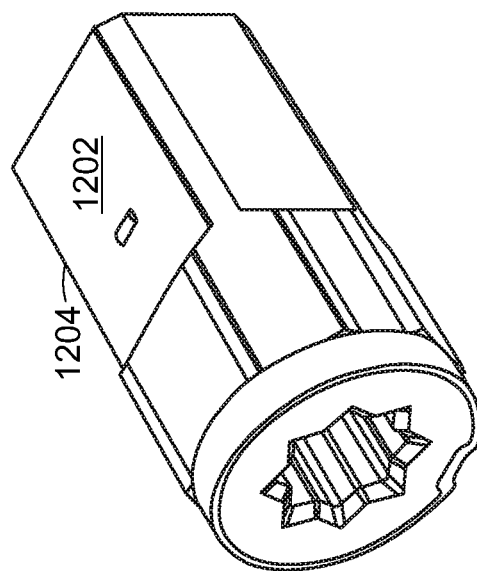
Figure 13C:
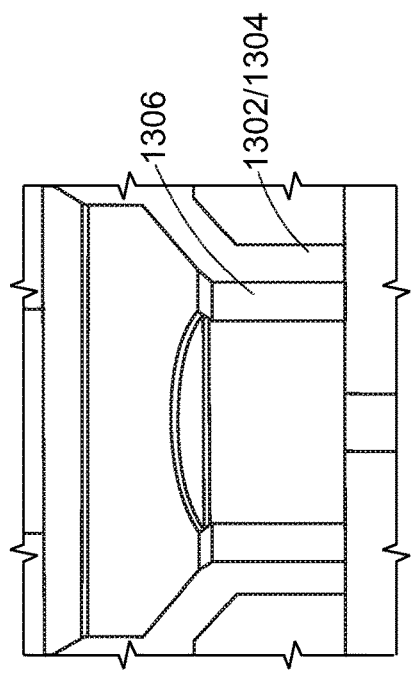
FIGS. 13A, B and C are views of the rack and sample tube having a protrusion in the rack for locking the sample tube at a fixed and consistent height within the rack.
Figure 13B:
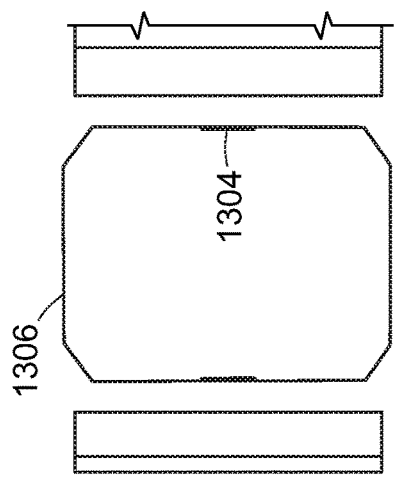
Figure 13A:
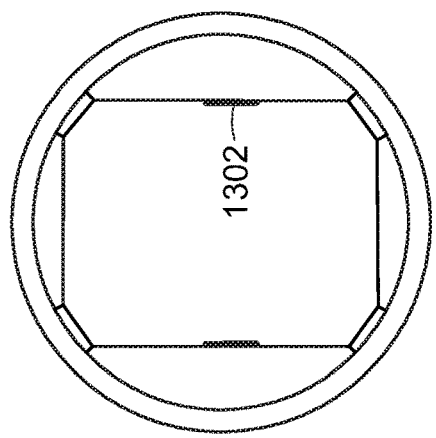
Figure 14A:
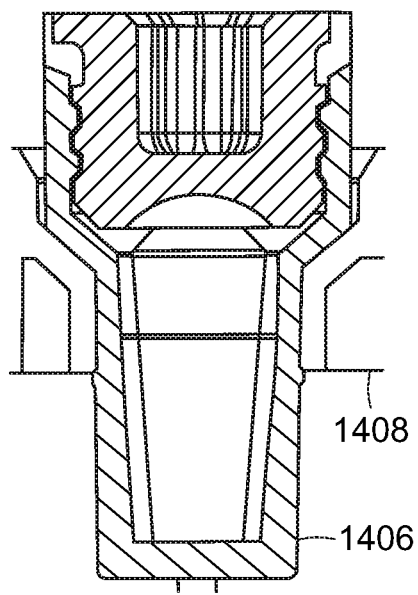
FIGS. 14A and B are a cross-sectional view of a sample tube and rack and enlarged view illustrating alternative protrusions for orienting a sample tube.
Figure 14B:
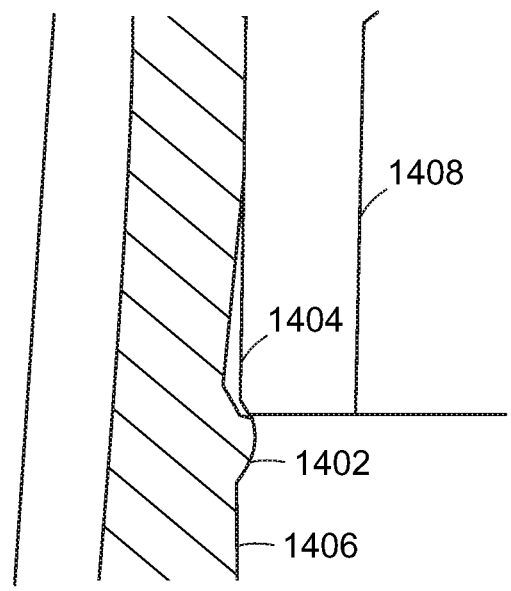

FIGS. 12 through 14 illustrate additional features that serve to orient the sample tube both rotationally and vertically. As illustrated in FIGS. 12A, B and C, a bump 1202 (protrusion) is formed on each of opposed flat surfaces at the bottom end of the sample tube. Those bumps are received by depressions in the complementing receptacle surfaces.

As illustrated in FIGS. 13A, B and C, the bump may instead be formed on the side of the receptacle to fit into a recess in the side of the sample tube.

In FIGS. 14A and B, protrusions are provided in each of the tube and receptacle. A protrusion 1402 is provided on the sample tube 1406, and a protrusion 1404 is provided on the receptacle 1408. The protrusion 1404 seats in a depression in the tube, and the protrusion 1402 seats below the receptacle edge.

In each of the above embodiments with protrusions, material or structure of the receptacle or tube allows some flexure so that the sample tube can slide into the receptacle. Also, angled surfaces allow for movement of the tube in a receptacle without initial friction as the protrusion moves into the depression.

Figure 15:
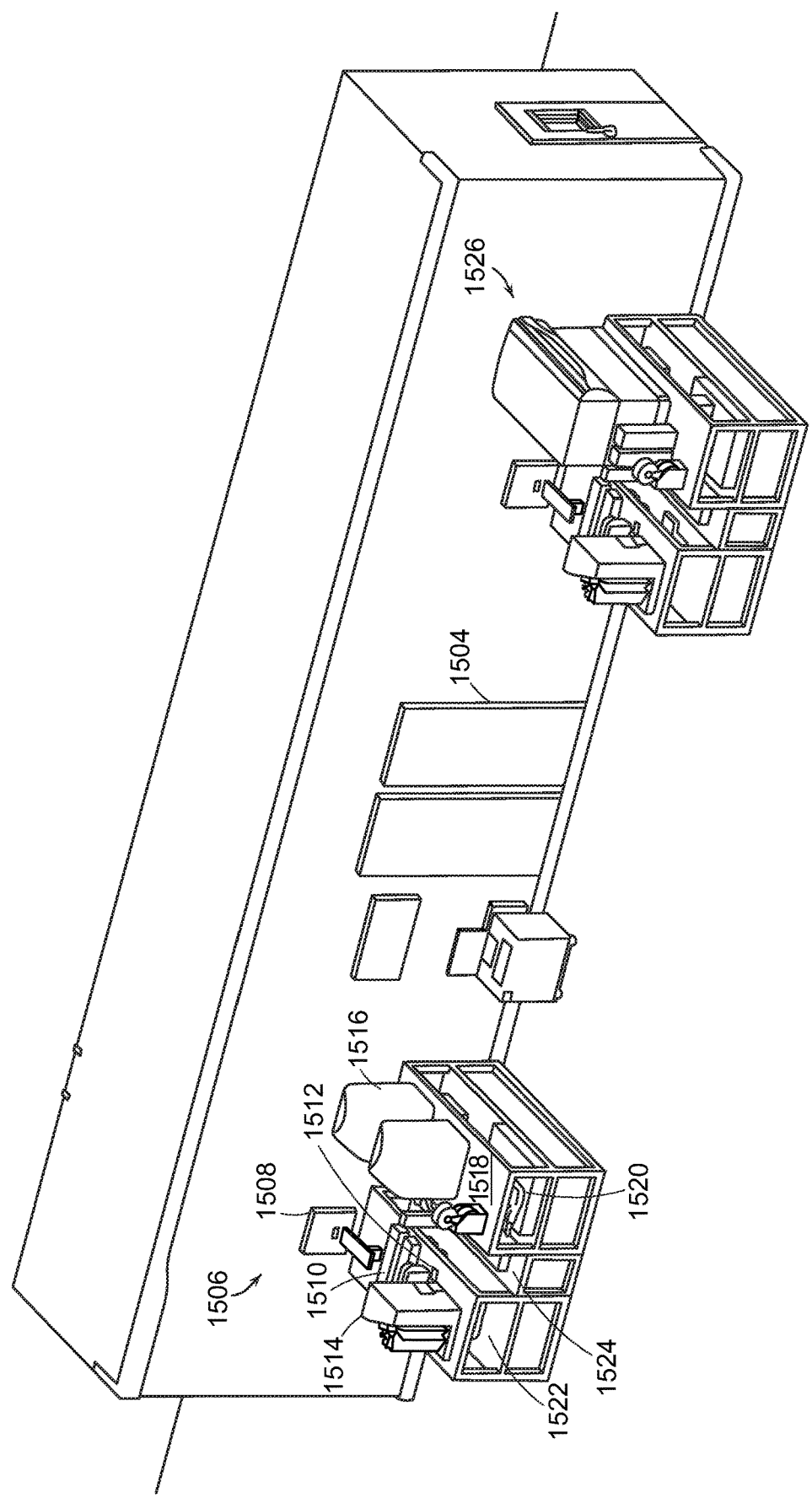
FIG. 15 is an illustration of a large sample tube storage system.

FIG. 15 illustrates a complete storage system in which the racks and sample tubes may be stored. The storage system includes a refrigerated store 1502 with many storage locations (not shown) for storage trays filled with sample tubes and/or trays of racks filled with sample tubes. Those racks are transported within the store using robotic transport systems. An input/output station behind the door 1504 allows scientists to place input/output racks into the store 1502. Also within the store is a picking station for picking tubes from the input/output rack and placing them into appropriate storage receptacles or other input/output racks. Suitable input/output racks are described in European Patent Application No. 16275011.1, filed on Jan. 20, 2016, and entitled "Automated Sample Storage System Having Storage Consumable with Sub-Optimal Storage Density," the contents of which is hereby incorporated by reference in its entirety. An imager is provided within the store for reading the 2-D barcode from the ends of the sample tubes while in the racks. The system may also include an acoustic dispensing system 1506.

The acoustic dispensing station includes an interface 1508 by which an automation interface module (AIM) automatically outputs a storage rack, for example, a tray with multiple storage racks, from storage. The station 1506 includes a thawing station 1510, label printer 1512, carousel storage 1514, two acoustic dispensing stations 1516, a film dispenser 1518 for applying a sealing film over a microplate, tube decappers 1520, and a station 1522 for removing sealing film from microplates. Racks are moved from station to station by means of a central robotic system 1524. Also included but not shown is a centrifuge. Additional stations such as the station 1526 may also be provided for analysis and other processing (e.g., liquid dispensing) for samples contained in racks or microplates.

A control system 1528 controls all automation within the store 1502 and, in some embodiments, peripheral systems such as acoustic dispenser 1506 and station 1526. The control system 1528 is generally implemented in software in a hardware system comprising data processors, associated memory and input/output devices. The processor routines and data may be stored on non-transitory computer readable media as computer program products. The system may, for example, be a standalone computer or network of devices. Included in the system is a database in memory associating each barcode identifier with, for example, a tube; a rack; a rack location; survey data; cooling, warming and/or processing history; and/or other sample, tube, or rack information.

Figure 16:
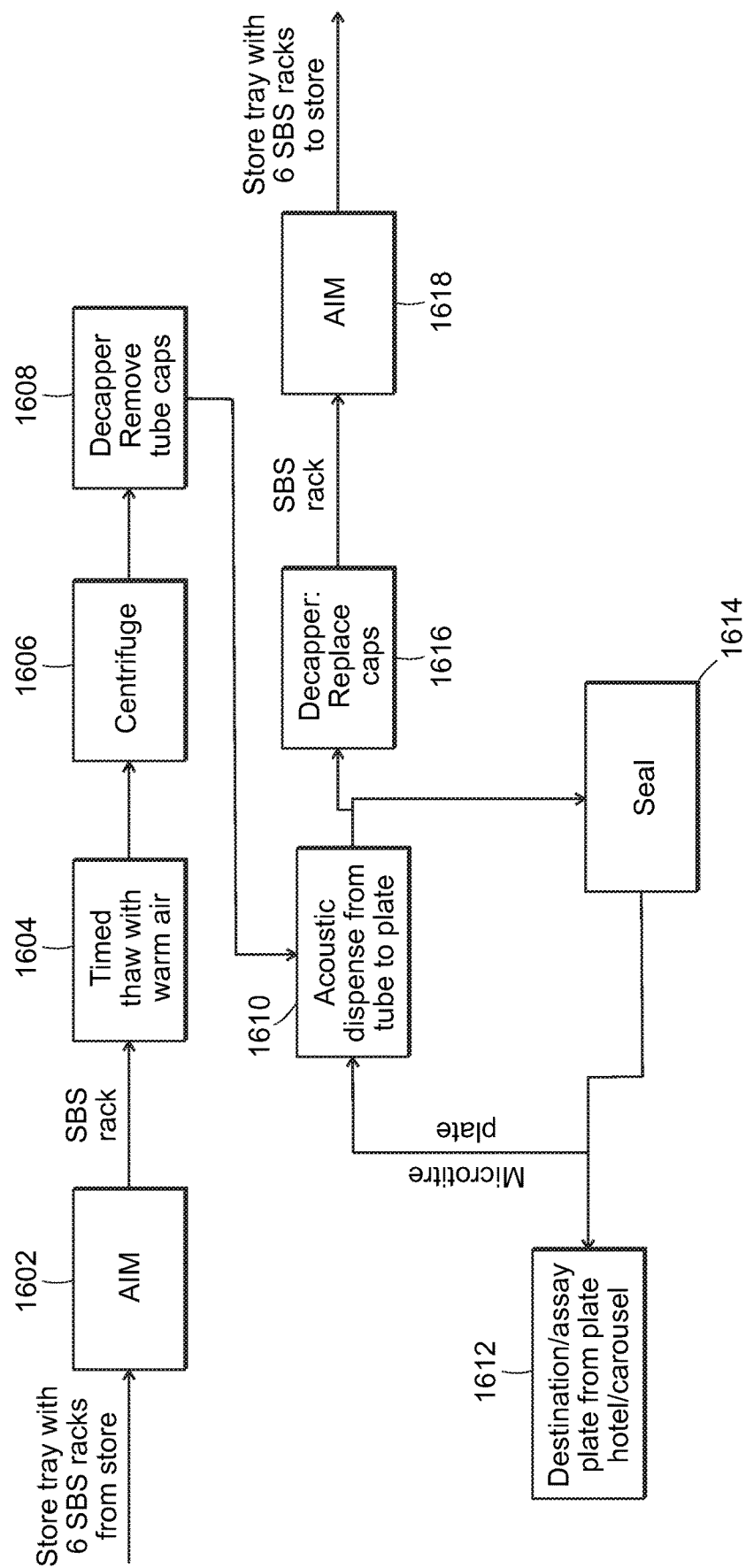
FIG. 16 is a flowchart of the automated transfer of sample tubes from a store, into the acoustic dispensing system of FIG. 15, and return of the sample tubes to the store.

In a typical operation illustrated in FIG. 16, the automation interface module outputs a tray of storage racks from the storage at 1602. A central robot from the acoustic dispensing system places the racks in the thawing station for a predetermined time or until a predetermined temperature is reached at 1604. Racks of tubes are then, optionally, transferred to the automatic centrifuge 1606. The racks of tubes are then transferred to the automated decapper 1608 to remove tube caps. The rack is sent to the acoustic dispenser 1610 where the destination microplate is also placed, and the samples are dispensed from the source tubes to the destination plate. The destination plate is then taken back to the storage carousel 1612 after automated sealing 1614. The tube rack is then returned to the decapper 1616 to have its caps returned to their original tubes, and the rack is returned to storage through the AIM.

Conventionally, the thawing system relies on a warm air blown from under the samples to speed up thawing. Other methods include resistive heating, conduction through a medium such as a water bath or microwave heating. Acoustic energy can also be used to heat samples, including samples in aqueous solution. Acoustic energy can be used to enable cell warming and transport without damage to the cell. Acoustic energy can limit the creation of hotspots that can occur with other types of warming. The temperature sensor 122 provided on the circuit chip 116 of FIG. 1D can provide real-time temperature feedback wirelessly from the sample. In combination with acoustic heating, samples of biological samples can be thawed and warmed according to a preprogrammed temperature profile or to a preprogrammed temperature threshold, the accuracy of which is vastly improved by the real-time feedback from the temperature sensor. The temperature sensor also provides similar advantages with other heating approaches. The real-time temperature feedback from the temperature sensor to precisely monitor and enable preprogrammed temperature profiles or a preprogrammed temperature threshold can optimize sample (e.g., cell) viability and avoid over heating and/or uneven heating and subsequent possible damage to samples.

Prior acoustic dispensing systems have relied on microplates having many wells containing the source materials/reagents. Accordingly, a single survey scan of the source plate provided survey information for all wells within the plate. That information would be stored with respect to the single microplate ID represented by a single barcode on the microplate. In the present system, each sample tube may be delivered on any rack and thus survey data must be retained for each tube. Thus the survey data must reference the tube ID as opposed to a single ID of an entire plate. Also, the orientation of each tube must be retained if the survey data is to be reused.

Figure 17:
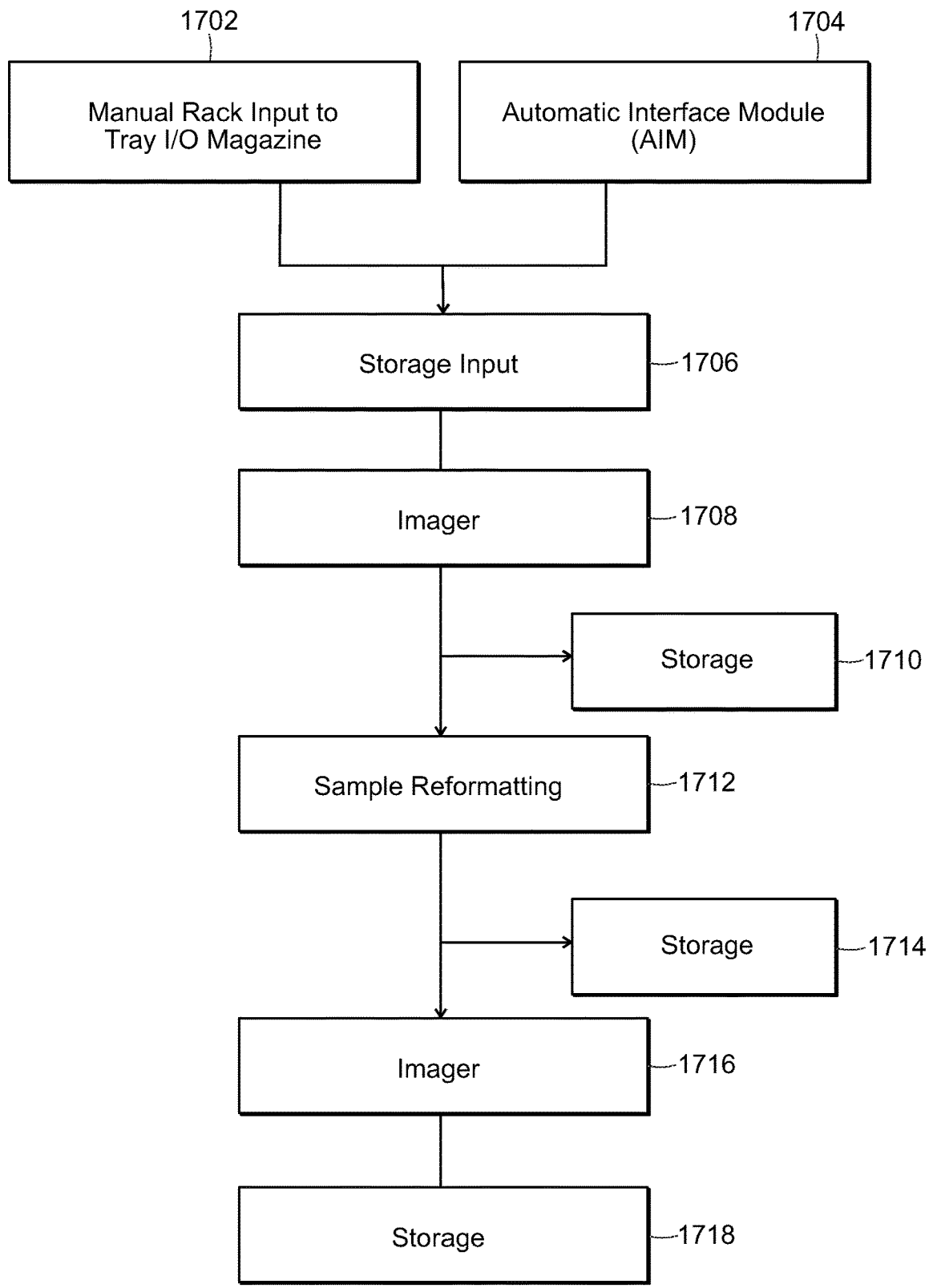
FIG. 17 is a flowchart of storage of sample tubes in the system of FIG. 15.

FIG. 17 is a flow chart for the process of storing tubes in racks in the storage system. A rack of sample tubes may be inputted at 1702 into a tray I/O magazine behind the door 1504. Alternatively, the tray with racks may be received at 1704 through the automatic interface module (AIM) such as through tray interface 1508. In either case, the racks position at the storage input may be passed through an imager 1708 which may image the barcodes at the bottom ends of all tubes on the rack. The rack may then be robotically transferred to the ultimate storage destination 1710. Alternatively, the sample tubes in one or more racks may be reformatted by removing tubes with a gripper at a picker station and appropriately returning the tubes to the same or different racks at 1712. After reformatting, the reformatted racks may be robotically moved to their ultimate storage location 1714. Optionally, the tubes may be reimaged at 1716 or empty racks may be imaged at 1716 to confirm that they are empty. Any racks to be stored are then robotically moved to their storage location at 1718.

Figure 18:
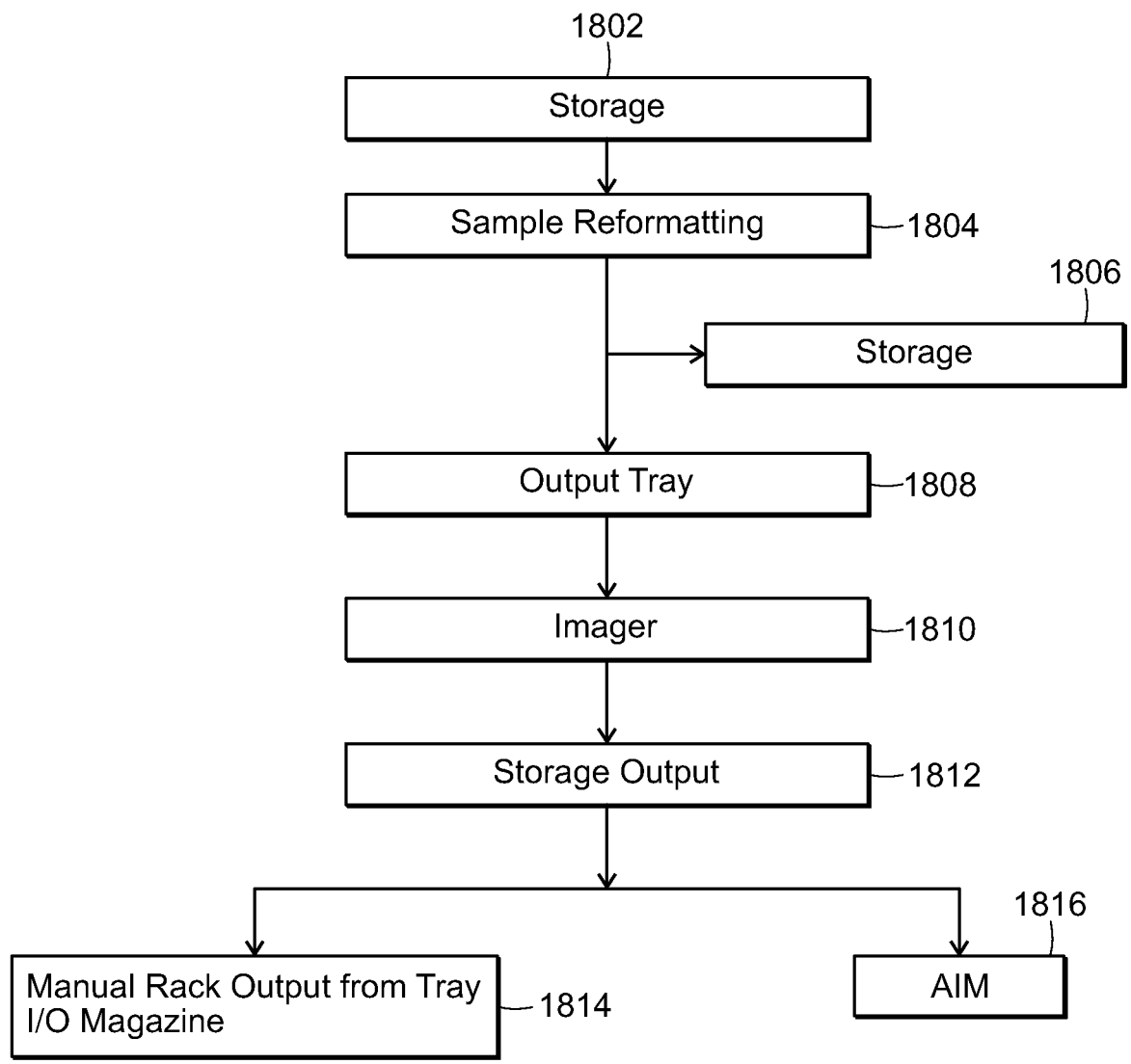
FIG. 18 is a flowchart of processing and outputting of sample tubes in the storage system of FIG. 15.

FIG. 18 is a flowchart illustrating likely automatic processing of rack mounted sample tubes within storage and output. The rack may be retrieved from storage at 1802 and forwarded to a picking station for sample reformatting at 1804. At sample reformatting, samples that are to be output are positioned on one rack while samples to be returned to storage are positioned on a different rack. Only those samples that need to be processed need be thawed and subsequently refrozen. Tubes not to be output are returned to storage 1806. The racks with tubes to be outputted are positioned on an output tray at 1808 which is moved to an imager 1810, at the imager, the identification and orientation of appropriate sample tubes is assured. From the imager, the tray is moved to storage output 1812 from which it may either be manually removed from the tray I/O magazine at 1814 or removed by the AIM at 1816.

At least in the case of acoustic dispensing, it is important that the orientation of sample tubes is maintained so that the survey data can be correctly applied in the dispensing operation. As discussed above, the flat slide pads on the cylindrical ends of the sample tubes facilitate proper orientation by preventing rotation of the tube during pick and place operations. The orientation of each tube when it is first loaded into the storage is recorded by imaging the distinctive barcode illustrated in FIGS. 11A-D. A tube having a square cross-section at the bottom end may have any one of four orientations; whereas, the tube having a non-square rectangular bottom end has one of only two possible orientations. If any errors are subsequently detected during imaging, the misoriented sample may be held for human inspection and correction or a resurvey by the acoustic dispenser may be requested. In other embodiments, a picking station within the storage system can be configured with a rotating gripper or other tube rotating mechanism to automatically reorient misoriented samples detected by the imaging device.

A typical industry standard tube rack has features that allow orientation of a full rack to be detected through its image. Users are expected to load racks in the correct orientation, but if input incorrectly, the error will be detected at an image. The user or system may then correct the orientation of the full rack. In other embodiments, the storage system can be configured with a device, such as a rack turntable, to automatically reorient misoriented racks detected by the imaging device.

Since prior acoustic dispensing systems have relied on microplates having many wells containing the source materials/reagents, when an acoustic dispenser has been used to transfer materials from a microplate, the entire microplate was uncovered, even if material was not to be transferred to the destination microplate from every well. By practicing the present invention, one can arrange a full or partial rack of desired tubes which are selected for inclusion in the source rack and/or selectively uncapped to expose only those samples or reagents that are desired for dispensing. Innocent, unneeded samples and reagents are not subjected to thawing and/or uncovering as in conventional acoustic dispensing from a microplate.

During acoustic dispensing, previously stored survey results may be retrieved based on the identifying barcode of an individual tube. Those historical survey results may then be used in the dispensing process. Alternatively, new data may be obtained through a survey. In some embodiments, store 1502 includes a controller and data storage system whereby survey data obtained from a particular tube can be transferred from a survey device (e.g., an acoustic dispenser) and stored. In some instances, the controller and data storage system can assemble a data packet containing data associated with tubes that have been placed into an input/output rack. The data packet will, in most instances, associate the data associated with a particular tube (e.g., survey data) with the position of the tube in the input/output rack. The controller and data storage system can then transfer the data packet to a device needing such information (e.g., a dispensing device). The data packet may be associated with a particular rack by using a rack barcode and the device can read the rack barcode and apply the associated data packet as needed for the device's operation.

While this invention has been particularly shown and described with references to example embodiments thereof, it will be understood by those skilled in the art that various changes in form and details may be made therein without departing from the scope of the invention encompassed by the appended claims.

What is claimed is:

1. A sample tube comprising:
   a sidewall that is substantially cylindrical, with a cylindrical axis, and open at one end, and non-cylindrical and closed with a bottom at the opposite end, the non-cylindrical, closed, opposite end having substantially rectangular cross-section inner and outer opposed flat wall surfaces that do not extend into the substantially cylindrical end, faces of the external wall surfaces facing radially outward with edges at the intersections of the external flat wall surfaces extending along the cylindrical axis; and four flat slide pad surfaces formed in the substantially cylindrical end of the sidewall configured to be gripped by complementary gripper surfaces of a gripper, assuring proper orientation of the sample tube relative to the gripper, the four flat slide pad surfaces of the substantially cylindrical end extending along the cylindrical axis and along the four edges of the substantially rectangular cross-section outer wall surfaces at the bottom end of the sample tube and facing radially outward, the flat side pad surfaces being narrower than and angled relative to the faces of the rectangular cross section outer flat wall surfaces of the closed, opposite end.

2. The sample tube as recited in claim 1 wherein the substantially rectangular cross-section is non-square with different length opposed flat wall surfaces.

3. The sample tube as recited in claim 2 wherein the slide pads are angled relative to the substantially rectangular outer wall surfaces about 45°.

4. The sample tube as recited in claim 1 further comprising a barcode on the bottom end of the sample tube, the barcode including an element to determine the orientation of the sample tube.

5. The sample tube as recited in claim 1 further comprising a protrusion on the sidewall configured to lock the sample tube within a rack.

6. The sample tube as recited in claim 1 wherein the slide pads are angled relative to the substantially rectangular outer wall surfaces about 45°.

7. A method of orienting sample tubes as recited in claim 1 in a rack comprising:

providing the sample tubes;

positioning the sample tubes in a rack having individual sample tube receptacles, each having a complementary non-cylindrical shape to receive the closed, opposite end of the sample tube; and raising at least one of the sample tubes from the rack into a gripper having gripper surfaces complementary to the flat slide pad surfaces formed in the substantially cylindrical end of the sidewall.

8. The method as claimed in claim 7 further comprising providing a barcode on the bottom end of the sample tube, the barcode including an element to determine the orientation of the sample tube.

9. The method as claimed in claim 7 further comprising providing a protrusion on the sidewall configured to lock the sample tube within the rack.

* * * * *